United States Patent [19]

Ralph

[11] Patent Number: 4,770,372

[45] Date of Patent: Sep. 13, 1988

[54] TWO-STAGE AIRCRAFT LANDING GEAR

[75] Inventor: Harry C. Ralph, County of King, Wash.

[73] Assignee: The Boeing Company, Seattle, Wash.

[21] Appl. No.: 913,850

[22] Filed: Sep. 30, 1986

[51] Int. Cl.[4] ............................................. B64C 25/10
[52] U.S. Cl. .......................... 244/102 R; 244/104 FP
[58] Field of Search ........... 244/100 R, 102 R, 104 R, 244/104 FP

[56] References Cited

U.S. PATENT DOCUMENTS

| | | | |
|---|---|---|---|
| 2,731,218 | 1/1956 | Bonar | 244/104 |
| 2,732,152 | 1/1956 | Neilson et al. | 244/104 |
| 2,856,180 | 10/1958 | Westcott, Jr. | 244/102 R |

FOREIGN PATENT DOCUMENTS

| | | | |
|---|---|---|---|
| 635885 | 4/1950 | United Kingdom | 244/102 R |
| 1109254 | 4/1968 | United Kingdom | 244/102 R |

Primary Examiner—Galen Barefoot
Attorney, Agent, or Firm—Seed and Berry

[57] ABSTRACT

A two-stage aircraft gear. The landing gear includes a cantilever landing gear whose lower end is attached to a trailing arm (or articulated) landing gear. The cantilever gear is a collapsible piston-cylinder assembly, and the trailing arm gear also has a shock absorber connected between a fixed portion of the trailing arm gear and the movable wheel support arm. When landing, the load imposed is first absorbed by the trailing arm landing gear. After the trailing arm gear has been fully compressed, the cantilever gear begins to compress. The cantilever and trailing arm landing gear can be combined to provide the desired performance. The landing gear static position can be designed to be in the static load curve of the first component, allowing the aircraft to be stably supported and yet difficult to overturn.

12 Claims, 5 Drawing Sheets

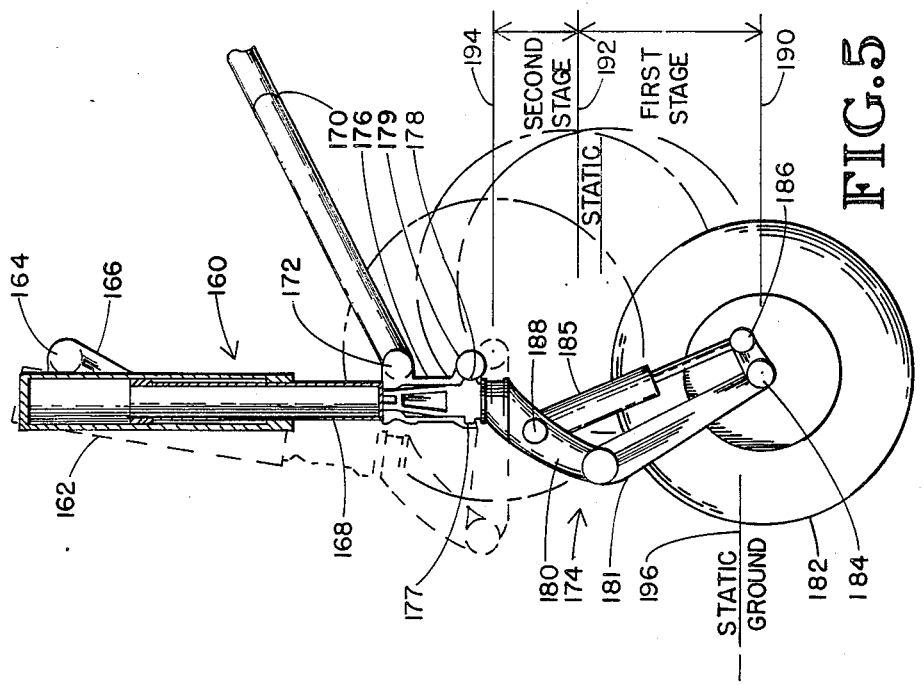
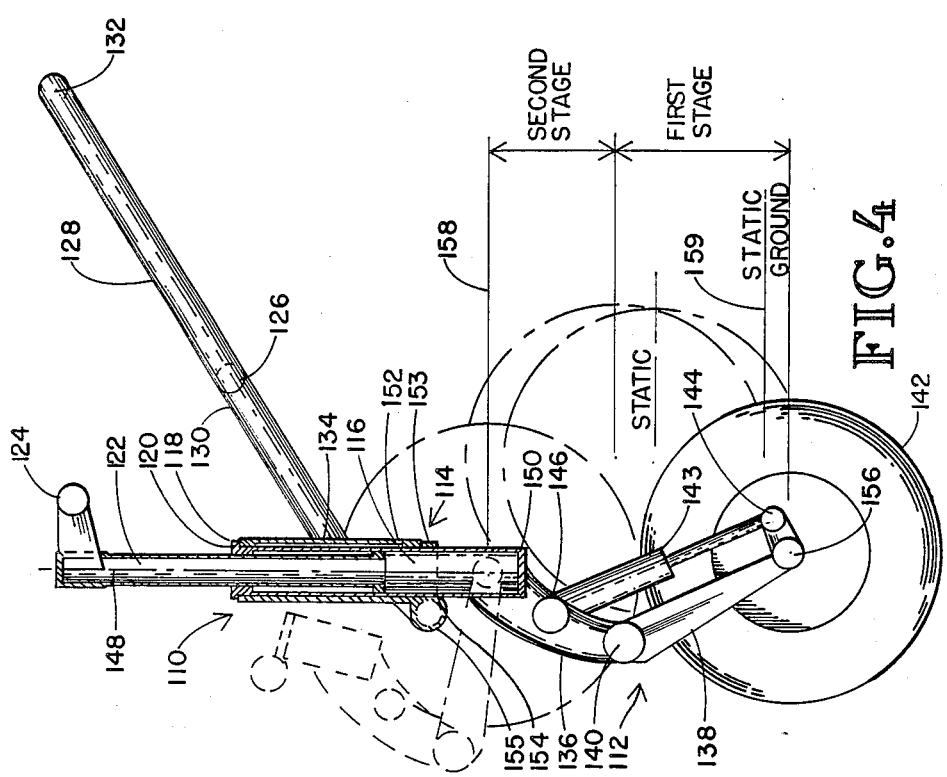

TWO-STAGE AIRCRAFT LANDING GEAR

DESCRIPTION

1. Technical Field

This invention relates to aircraft landing gear, and more particularly, to a two-stage aircraft landing gear having the load characteristics of an articulated landing gear in its first stage of compression and the load characteristics of a cantilevered landing gear in a successive stage of compression.

2. Background Art

The two most common landing gear configurations are (1) the cantilevered type and (2) the articulated (or trailing arm) type. The cantilevered landing gear configuration has a wheel supported by a spring-shock absorber assembly that is a piston mounted in a cylinder filled with a compressed gas (such as nitrogen) and an oil (such as silicone). The piston has orifices that communicate from one side of the piston head to the other side, the orifices being covered by the oil. The landing gear obtains a spring characteristic from the compressability of the gas and a shock absorber characteristic from the passage of the oil through the orifices. The static response of the cantilevered gear is determined by the gas spring, while its dynamic response is determined by both the gas spring and the shock absorber. Because this configuration exhibits the static characteristics of a single-stage spring, the cantilevered gear has a long, static axle travel. This greatly reduces the vertical separation between the underbody of the aircraft and the ground, this separation also being known as the "headroom."

Occasionally, in an attempt to reduce this long, static, axle travel, two-stage spring assemblies are used in cantilevered gear. However, these two-stage springs create undesirable service problems because they contain two interrelated pressures which must be continually balanced for the two-stage spring to operate consistently.

When a cantilevered landing gear is fully extended, the ratio of extension of the strut beyond the cylinder body to the length of the strut remaining in the cylinder body is very high. The horizontal loads created by landing with such gear cause very high bearing friction between the strut and the cylinder body and consequently cause abnormal wear at this point. The cantilevered gear configuration, when used with aircraft presenting high vertical landing velocities, and, consequently, high dynamic loads, necessitates the use of long, slender gear and results in large deflections in the fore, aft, and side directions.

An articulated (or traveling arm) landing gear utilizes a wheel mounted at the end of an arm that pivots vertically about a horizontal axis. The pivotal movement of the arm is resiliently restrained by a gas- and oil-filled spring-damper assembly, of the type described above, extending between the pivot arm and a fixed support. As with the cantilevered gear, the articulated gear also experiences reduced headroom because of the long axle travel required to achieve static balance. The length of the trailing arm is proportional to the vertical axle travel, so that large axle travel requires a long trailing arm and results in heavy and bulky hardware, including a pivot fitting. This is particularly true when a great deal of kinetic energy must be dissipated in the landing, i.e., the landing has a high ground reaction factor.

Aircraft landing gear incorporating both a cantilevered strut, including a piston-cylinder spring-damper assembly, and a bogie supporting one or more landing gears pivoting in a vertical plane around the lower end of the strut have also been used. Some shocks experienced by the bogie are contained by a shock absorber connected between the bogie and the part of the cantilevered strut that is attached to the aircraft. However, such landing gear are unnecessarily complex, bulky, and difficult to maintain. In addition, these gear suffer from the extensive vertical axle travel problems of cantileverd and articulated landing gear.

It is well known that the length of axle travel of aircraft landing gear compress to absorb landing load kinetic energy. This kinetic energy and the work done by the landing gear are equal, and both are proportional to the weight of the aircraft. Therefore, the axle travel, i.e., the distance through which the kinetic energy is dissipated, is independent of the weight of the aircraft. This means that, for the same vertical descent velocity, the axle travel required when landing a smaller aircraft is identical to that required for a larger aircraft, but is a greater proportion of the headroom available. In other words, the landing gear of a large aircraft may be capable of being compressed through a range that is several times longer than the range of compression of a small aircraft's landing gear. Yet the landing gears for both smaller and larger aircraft will be compressed by the same amount when landing at the same vertical velocity. Accordingly, the headroom limitations for small aircraft, which are designed to be closer to the ground, are more problematical than are the limitations for larger aircraft. In particular, small aircraft capable of landing with high descent velocities have severe headroom problems.

Generally, landing gears supporting a stationary aircraft are static at approximately 80-90% of the available landing gear axle travel. Because the load-axle travel characteristics of landing gear are usually very stiff at these long strokes, a stationary aircraft is very stable. On the other hand, the landing gear stroke remaining between the static and the fully compressed positions is usually to small to allow the aircraft good rough field performance.

DISCLOSURE OF THE INVENTION

It is an object of the present invention to provide an aircraft landing gear having a two-stage landing load characteristic.

It is another object of the present invention to provide an aircraft landing gear having reduced headroom requirements.

It is yet another object of the present invention to provide a two-stage aircraft landing gear whose static position is in the first stage.

It is a further object of the present invention to provide an aircraft landing gear capable of allowing extensive vertical axle travels for aircraft which land at high vertical velocities.

It is still another object of the present invention to provide a two-stage aircraft landing gear particularly adapted for use on rough landing fields.

These and other objects of the invention are accomplished by an aircraft landing gear including a first cantilevered strut having first and second ends defining a longitudinal axis and a length that is a first function of the compressive force applied to the strut along the longitudinal axis. The strut is attachable to the aircraft at its first end. The landing gear further includes a trailing arm having an upper first end pivotally secured to the second end of the first strut and a wheel attached to a lower end of the trailing arm, the wheel being rotatable about a horizontal axis. Further, the landing gear comprises a second strut pivotally connected between the trailing arm and the lower second end of the first strut. The second strut has a length that is a second function of the compressive force applied to it. The above combination produces a landing gear which is capable of two-stage operation.

In the two-stage landing gear of the present invention, the articulated gear, including the trailing arm, the rotatable wheel, and the second strut, initially responds to an applied load. This response continues as the load increases beyond the static load of the aircraft, at which point the second shaft of the articulated gear has been fully compressed. As additional load is applied, the landing gear enters its second stage, where the first cantilevered strut begins to collapse. The landing gear continues to collapse with the increasing load until the first cantilevered gear is fully collapsed. The static load position of this landing gear occurs within the first stage, and so substantially greater headroom can be provided with this gear while maintaining the stiffness characteristic desired to provide greater stability to the static aircraft. When landings are made with relatively low vertical velocities, the landing gear stays in its first stage. However, when the landings have greater vertical velocities, the landing gear enters its second stage, substantially increasing the vertical stroke that can be taken by the landing gear. The extra stroke provided by the second stage is particularly useful when landing on or taking off from a rough field. The size and weight of the trailing arm and all related components are minimized due to the relatively small axle travel involved with the two-stage landing gear.

BRIEF DESCRIPTION OF THE DRAWINGS

FIG. 4 is an elevational view of a first embodiment of a two-stage aircraft landing gear comprising both cantileverd and articulated landing gear.

FIG. 5 is an elevational view of a second embodiment of a two-stage aircraft landing gear combining cantilevered and articulated landing gear.

BEST MODE FOR CARRYING OUT THE INVENTION

Figure 1:
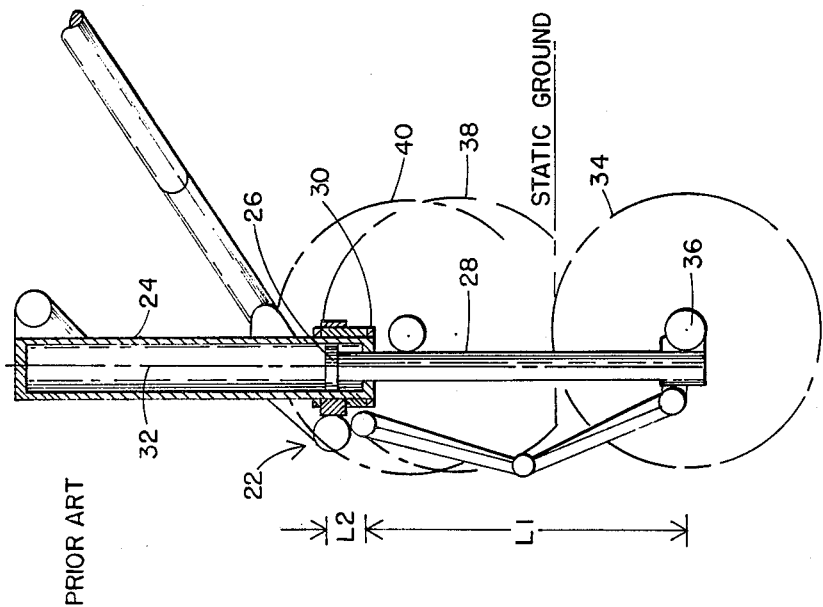
FIG. 1 is an elevational view of a prior art cantilevered aircraft landing gear, with phantom views showing both static and fully compressed wheel positions.

Referring now to FIG. 1, a cantilevered landing gear 20 known in the prior art includes a piston-cylinder assembly 22 having cylinder 24 containing piston 26 within. Strut 28, attached to the piston, extends beyond closed end 30 of the cylinder. The cavity 32 of the cylinder can contain a compressible gas, such as nitrogen, and possibly an oil, which is forced to pass through small orifices in the piston. This strut is a spring-damper assembly. The piston has small clearances with respect to the inner walls of the cylinder, and the strut, passing through end 30 of the cylinder, has close tolerances with the inner diameter of the end cap at end 30. When the aircarft is airborne and thus not supporting the weight of the aircraft, the piston and attached strut are fully extended within the cylinder. Wheel 34, attached to the downwardly disposed end of the strut at a horizontal axle 36, moves upwardly with respect to the cylinder as the landing gear begins to absorb the landing load of the aircraft. After the aircraft has landed, the static position of the wheel is as indicated by the wheel in phantom-view position 38. The fully compressed position of the wheel is shown in phantom view 40.

Upon landing, the high drag loads created as the wheel is caused to spin up to landing speed react horizontally against the wheel-supporting strut. When the landing gear is in its fully extended position, the extension $L_1$ of strut 28 beyond cylinder end 30 is significantly greater than the length $L_2$ of the strut 28 remaining in the cylinder 24. Consequently, the bending couple between the strut 28 and cylinder 24 resulting from the high horizontal loads on the strut 28 produce high bearing loads between the piston 26 and the inner wall of the cylinder 24, and between the strut 28 and the end of the cylinder 24. These high bearing loads produce substantial bearing friction and wear.

Figure 2:
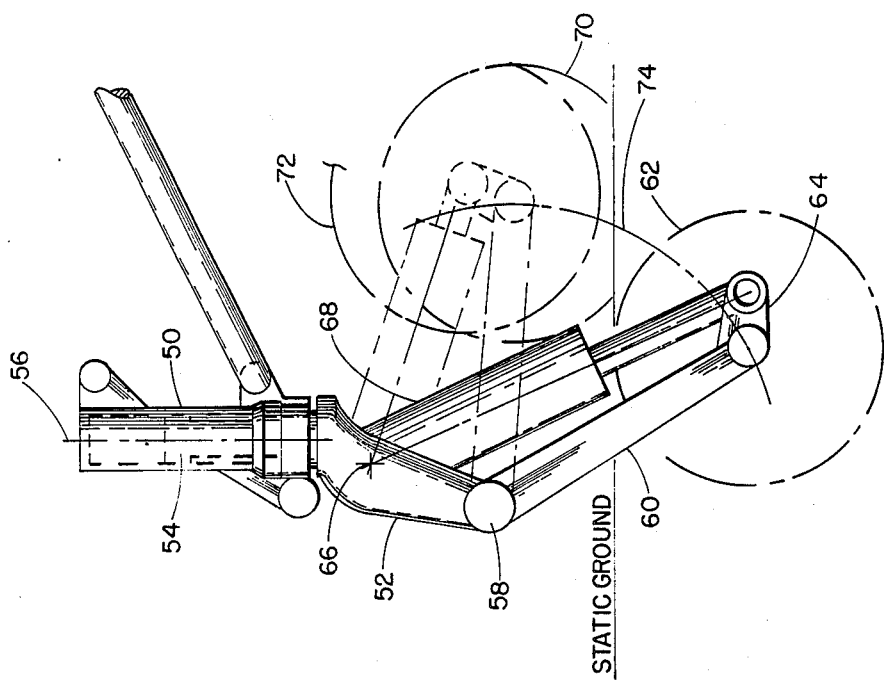
FIG. 2 is an elevational view of a prior art articulated (traveling arm) landing gear, with phantom views showing the static and fully compressed attitudes of the landing gear.

FIG. 2 shows a prior art articulated (or trailing arm) landing gear. In its fully extended condition, this landing gear hangs from support 50, which is attached to the aircraft at its upper end. Wheel support arm 52 has an extending piston which reaches into a cylindrical cavity of support 50. This allows the support arm to pivot about the vertical axis 56. A trailing arm 60 is pivotally connected to the lower end of support arm 52 about a horizontal pivot axis 58. a wheel 62, also rotatable about a horizontal axis, is attached to the lower end of trailing arm 60. A spring-damper strut 68 is connected between a boss 64 and a swivel point 66 on the wheel support arm 52. Shown in phantom views are the rest position 70 and the maximum vertical travel position 72, respectively, of wheel 62. As a load is applied to wheel 62, the wheel support arm rotates about point 58, causing the axle of wheel 62 to follow the semicircular path 74.

Figure 3:
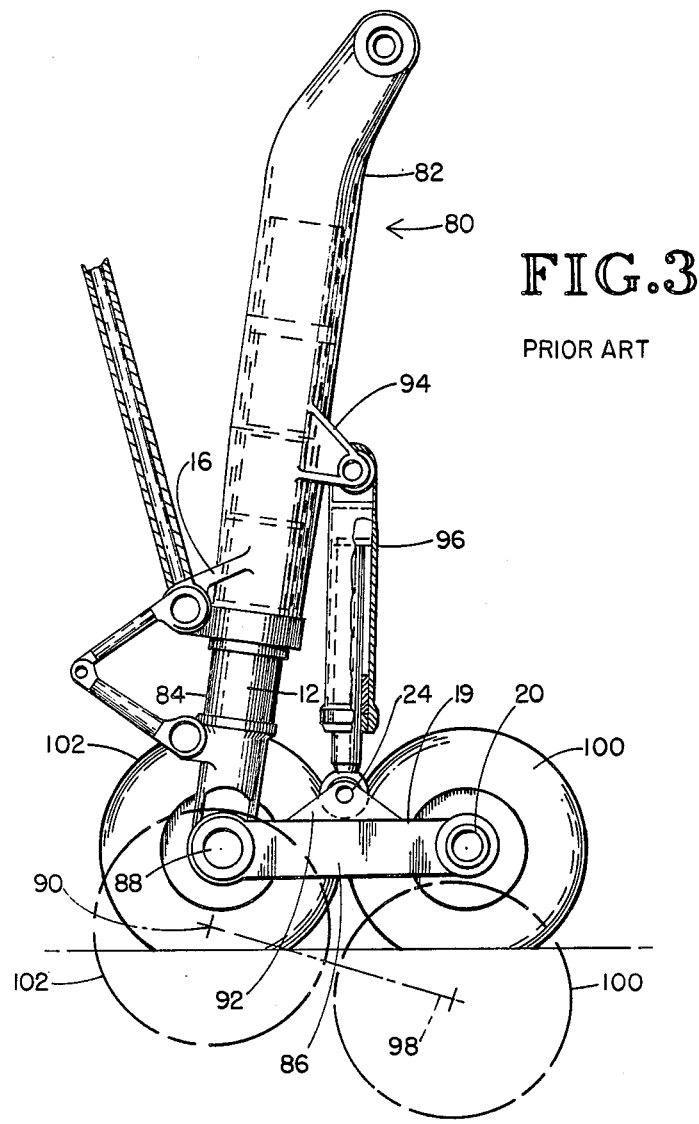
FIG. 3 is an elevational view of a prior art bogie-type aircraft landing gear in its static position, with phantom views showing the position of the gear with no load applied.

FIG. 3 is an elevational view of a prior art bogie-type landing gear, such as is used in larger commercial aircraft. An example is disclosed in U.S. Pat. No. 2,731,218, to Bonar. In this gear, telescoping strut 80, comprising cylindrical portion 82 and piston portion 84, is supported from the aircraft at its upper end. Telescoping strut 80 does not serve a shock absorbing function, but serves solely as a structural guide. A bogie 68 is attached at point 88 to the lower end of the piston portion of the telescoping strut. In reaching its fully relaxed state, the telescoping strut extends until point 88 reaches location 90. A spring-damper 96 is connected between boss 92 and boss 94 on the cylindrical portion of the telescoping strut. When the aircraft becomes airborne, spring-damper 96 extends, allowing the bogie 86 to droop to a position indicated by line 98.

Rear wheel 100 is oriented to be the first wheel to touch the ground upon landing. Subsequently, as more load is absorbed by the landing gear, spring-damper 96 collapses slightly until both wheels 100 and 102 are touching the ground. Beyond this point, as further load is applied to the landing gear, both spring-damper 80 and spring-damper 96 collapse further, until the landing gear assumes the configuration shown in solid lines in FIG. 3. This static position is characterized as being a relatively large vertical distance removed from the vertical distances of its components when no load is applied.

FIG. 4 shows a first embodiment of a two-stage landing gear according to the present invention. It can readily be seen to be a combination of cantilevered telescoping strut 110 and trailing arm 112. The strut 110 comprises a cylinder 114 containing a piston assembly 116, to form a fluid spring, and may also include a damping fluid and orifices through the piston head to form a fluid spring-damper. According to this construction, strut 110 has a longitudinal axis and assumes a length that is a function of the load applied to the strut along this axis. The length of strut 110 can be maintained within predetermined limits by the incorporation of physical stops in its structure. Cylinder 114 has an end cap 118 containing a seal 120 through which support 122 extends. The support is integral with the piston in the cylinder, and the upper end of the support pivotally attaches to the aircraft at boss 124. A support 126, comprised of an upper linkage 128 pivotally connected to a lower linkage 130, extends between the aircraft and the cylinder. Upper linkage 128 is pivotally attached to the aircraft at point 132, while the lower linkage 130 is pivotally attached to the cylinder 114 at point 134. The support 126 is used to retract the landing gear by pivoting support 122 about boss 124, and it also braces the landing gear in its lowered configuration. As will be apparent to those skilled in the art, an increase in the load borne by the strut 110 will cause the overall length of the assembly to decrease, the assembly rotating in a clockwise direction about boss 124. This rotation is constrained by the length of support 126.

An extension 136 extends downwardly from the lower portion of strut 110. The lower end of the extension 136 is pivotally attached to a wheel support arm 138 at point 140. A wheel 142 is attached by means of a horizontal axle to the lower end of wheel support arm 138. A telescoping fluid spring 143 (or possibly a spring-damper) connects a point on boss 144 to a point 146 on the extension. The length of fluid spring 143 is a function of the load applied between its two ends.

The landing gear of FIG. 4 is steerable by rotation about vertical axis 148. The lower portion of the cylinder is a sleeve 150. The sleeve rotates about axis 148 within an outer shell 152 of the cylinder. By means of a rack and pinion consisting of a ring gear 153 placed circumferentially around sleeve 150 and a pinion 154 driven by a hydraulic actuator 155 attached to the outer shell, the trailing arm can be steered.

In its unloaded condition, the strut 110 is fully extended, with the axis of strut 110 being approximately vertical and the trailing arm 112 falling downward to the extent permissible by the strut 143 connecting points 144 and 146. As the wheel 142 contacts the ground and the load imposed on the landing gear increases, the overall distance between axle 156 and boss 124 is decreased, at first by a rotation of arm 138 about pivot point 140. This rotation can continue until the landing gear reaches a second stage, at which point the wheel support arm may have passed beyond horizontal. Beyond this point, with the landing gear in its second stage, the vertical distance between the axle and boss 124 decreases further by a decrease in the length of strut 110. This collapse can continue until the vertical location of the axle 156 reaches the level indicated by line 158, denoting the end of the second stage travel. In this configuration, the static load is maintained with virtually no compression of the landing gear. This is indicated by static ground line 159. Accordingly, it can be seen that the landing gear of FIG. 4 realizes substantial headroom while continuing to exhibit two distinct stages in its load-travel curve. This latter aspect will be described in greater detail subsequently.

FIG. 5 of the drawings illustrates yet another embodiment of a landing gear according to the present invention. In this embodiment, cantilevered telescoping strut 160 is inverted from strut 110 of FIG. 4. In particular, its cylindrical part 162 is attached to the aircraft at point 164 on boss 166, which is integral with the cylinder. The piston part 168 telescopes inside the cylinder, realizing a shortening of its overall length as the load increases on the landing gear. As shown in FIG. 4, the landing gear of FIG. 5 also includes a support 170 whose lower end is pivotally attached to a boss 172 on the piston part of the piston-cylinder assembly and whose upper end (not shown) is attached to the aircraft. Thus, as the load increases on the strut 160, the strut 160 rotates clockwise.

Trailing arm assembly 174 is rotatably attached to the lower end of strut 160 at bearing 176. By this configuration, the trailing arm assembly 174 can rotate about the axis of the strut 180, either freely or under the control of a steering mechanism. The steering mechanism comprises ring rack 177, pinion 178, and hydraulic actuator 179, and operates in the same fashion as the steering mechanism of FIG. 5.

The trailing arm assembly 174 also includes an extension 180 extending downwardly from bearing 176 and a trailing arm 181 pivotally attached to the extension 180 at its upper end and to wheel 182 by horizontal axle at its lower end 184. A telescoping strut 185 is connected between a point 186 on the lower end of the trailing arm and point 188 on the extension 180 of the traveling arm assembly 174.

The two-stage characteristic of the landing gear shown in FIG. 5 is very similar to that shown in FIG. 4, with the first portion of the load borne by the strut 185 of the trailing arm assembly 174 and further load being absorbed by collapse of the strut 160. The unloaded axle level is indicated by line 190, the transition between the first and second stages by line 192, and the end of the second stage by line 194. As with the landing gear of FIG. 4, the embodiment in FIG. 5 has a static ground level 196 which is only a small fraction of the total vertical travel achievable by this landing gear.

The landing gear shown in FIGS. 4 and 5 differ from the prior art of FIGS. 1 and 2 in that the landing gear of the present invention actuates in two distinct stages, while the landing gear in FIGS. 1 and 2 are single-stage landing gear. As will be shown subsequently, the response of the two-stage landing gear of the present invention differs substantially from the response of the prior art landing gear shown in FIGS. 1 and 2.

The landing gear of the present invention shown in FIGS. 4 and 5 also differ substantially from the prior art landing gear of FIG. 3. Referring to FIG. 3, strut 96 can be seen to connect a point on bogie 86 to the cylindrical portion 82 of spring-damper 80, which is flexibly connected to the aircraft. The landing gear of the present invention, however, shows the struts 143 and 185 in FIGS. 4 and 5, respectively, connected between the wheel ends of the respective trailing arms 138 and 181, and points respectively on wheel support arm 138 (FIG. 4) and extension 180 (FIG. 5). These latter two points are attached to the lower portion of the respective cantilevered struts 110 and 160. The linkage of the landing gear of FIGS. 4 and 5 is fundamentally different from the linkage of the prior art landing gear in FIG. 3, because the two struts of the prior art landing gear shown in FIG. 3 cannot collapse independently, whereas the two struts of each of the landing gear in FIGS. 4 and 5 do. It is precisely the two-stage operation of the present invention that leads to a new and particularly advantageous form of landing gear.

Figure 6:
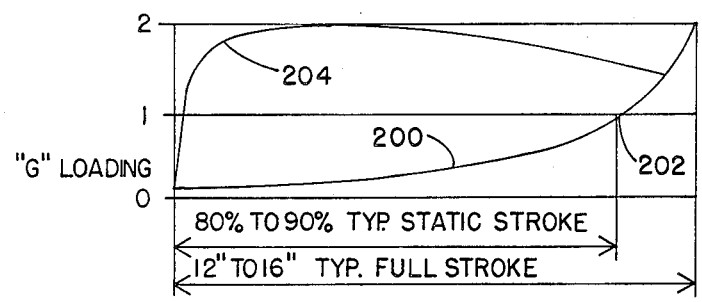
FIG. 6 is a landing load curve for a prior art single-stage landing gear designed for a maximum vertical descent velocity of a 12 feet/second.

FIG. 6 shows a typical load-stroke curve for a land-based aircraft having a single-stage landing gear. Such an aircraft has a typical maximum vertical descent velocity of 12 feet/second and 12-16 inch typical full stroke. The horizontal axis of the coordinates in which these curves are presented is the vertical stroke experienced by the landing gear, while the vertical axis of the coordinate system is the load absorbed by the landing gear, expressed as the ratio between the landing force and the weight of the aircraft. Thus, curve 200, the static load curve, shows the stroke experienced for a given fraction of aircraft weight. Point 202 is where curve 200 crosses the load abscissa corresponding to the static weight of the aircraft (i.e., "g" = 1). It can be seen that the stroke corresponding to this point is roughly between 80-90% of full stroke. A typical dynamic curve for such an aircraft using a one-stage landing gear is shown by curve 204. The forces experienced by such landing gear can typically be as high as twice the static weight of the aircraft. In a landing, this maximum level can be experienced before the landing gear has traveled even 50% of its full stroke.

Figure 7:
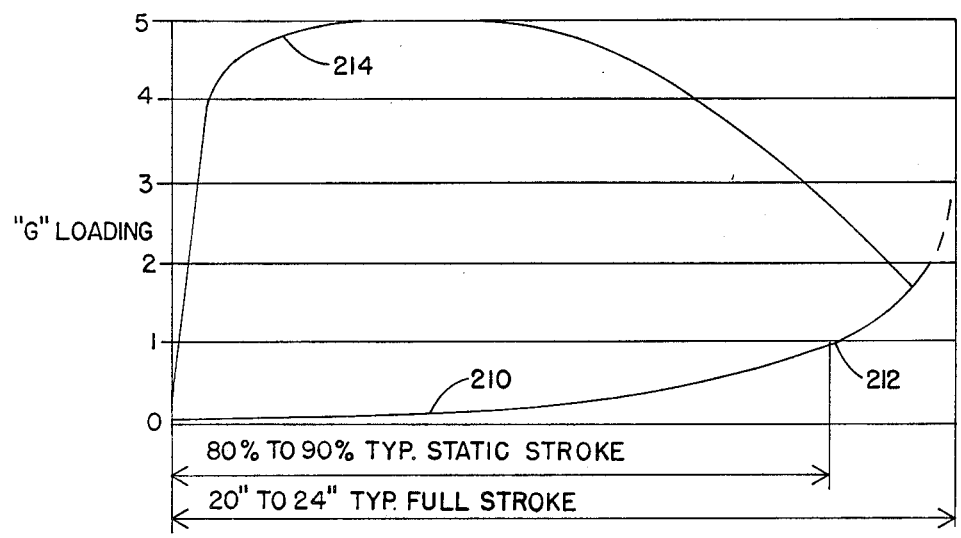
FIG. 7 is a landing load curve for a prior art single-stage landing gear designed for a maximum vertical descent velocity of 24 feet/second.

FIG. 7 presents curves corresponding to those shown in FIG. 6, but for an aircraft based on an aircraft carrier. Such aircraft can experience a typical maximum vertical descent velocity of 24 feet/second, and the landing gear must be designed to absorb as much as five times the static weight of the aircraft. Curves 210 and 214 correspond to curves 200 and 204 of FIG. 6, and point 212 corresponds to point 202 of FIG. 6.

Figure 8:
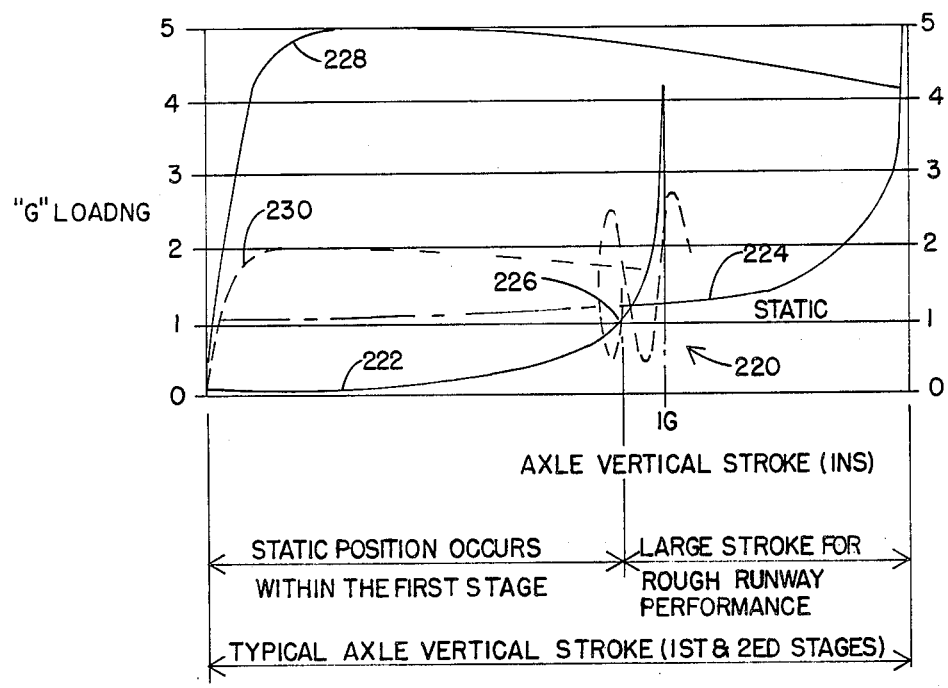
FIG. 8 of the drawings is a landing load curve for a two-stage aircraft landing gear of the present invention.

FIG. 8 shows typical load-stroke curves for an aircraft carrier-based aircraft using a two-stage landing gear according to the present invention. As mentioned above, such aircraft can experience a maximum vertical descent velocity of 24 feet/second and the landing gear can experience loads as great as five times the static weight of the aircraft. Static curve 220 consists of two subcurves: first stage subcurve 222 and second stage subcurve 224. In the first stage, as the load supported by the two-stage landing gear is slowly increased, because its collapse is characterized by only one of the two components of the landing gear (for example, the trailing arm landing gear component), subcurve 222 is simply the static curve corresponding to that single component. Proper designation of the parameters of this component allows the static position, indicated by point 226, to be located within the static curve describing the first stage. As the static load carried by the landing gear increases into the second stage, the static performance of a gear is characterized by subcurve 224. This characteristic curve corresponds to the second component of the landing gear.

Curve 228 shows a typical dynamic curve when the aircraft is used by a carrier-based aircraft landing at a maximum vertical descent velocity of 24 feet/second. Curve 230 shows the dynamic curve experienced when this same aircraft lands at a lower vertical descent velocity, for example, 12 feet/second. It is apparent from the curves of FIG. 8 that, by proper designation of the landing gear parameters, the static point for the landing gear can be achieved while using considerably less than 80-90% of the total vertical stroke available. In curve 220, the static position is located at a point described by approximately 60% of the total vertical stroke, although by proper design of the first stage, this static point can be located at substantially less than even 50% of the total vertical stroke available.

As illustrated in FIG. 8, there are three particular advantages of the two-stage landing gear of the present invention over landing gear known in the prior art. The first is that under static conditions, represented by point 226, the landing gear is "stiff," as represented by the slope of curve 222 at point 226. Secondly, because the static position of the two-stage landing gear occurs within the first stage, the landing gear can accommodate substantially more axle stroke before both struts have reached their end of travel. The landing gear, therefore, has substantially reduced headroom requirements as compared to the prior art. Finally, the extensive vertical axle travels provided by the two-stage landing gear makes it particularly suitable for use on rough landing fields.

It will be apparent to those skilled in the art that a variety of modifications and alternative configurations of the landing gear of the present invention can be made without departing from the scope and spirit of the present invention. Such modifications will include, but not be limited to, the use of multiple coaxial wheels, gear having torque links, and foldable gear. It will also be apparent that, if desired, the first stage of actuation of the present landing gear can be compression of the cantilever gear, while the second stage is an actuation of the trailing arm gear.

I claim:

1. A landing gear for use with an aircraft, comprising, in combination:

a first strut having first and second end portions defining a longitudinal axis, said first strut having a length between its first and second end portions that is a first function of the compressive force applied to said first strut along said longitudinal axis, said first strut being pivotally attachable to said aircraft at its first end portion;

a support having first and second ends, the first end of said support being pivotally attachable to said aircraft, the second end of said support being pivotally attached to said first strut at a first point on said second end portion of said first strut;

a wheel support arm having an upper first end pivotally secured to said first strut at a second point on the second end portion of said first strut;

a wheel attached to a lower end of said wheel support arm, said wheel being rotatable about a horizontal axis; and a second strut having third and fourth end portions, said third end portion being pivotally connected to said wheel support arm and said fourth end portion being pivotally connected to a third point on the second end portion of said first strut, said second strut having a length that is a second function of the compressive force applied to said second strut between said third and fourth end portions, said first and second struts being independently compressible.

2. The landing gear of claim 1 wherein said first strut is capable of changing length within predetermined limits.

3. The landing gear of claim 1 wherein said first strut comprises a telescoping fluid spring.

4. The landing gear of claim 1 wherein said second strut comprises a telescoping fluid spring.

5. The landing gear of claim 1 wherein the upper first end portion of said wheel support arm is attached to said second end of said first strut by a joint which is pivotable about a horizontal axis.

6. The landing gear of claim 1 wherein said landing gear is steerable.

7. The landing gear of claim 1 wherein said wheel support arm is rotatable about said longitudinal axis with respect to the aircraft.

8. A landing gear for use with an aircraft, comprising, in combination:
a first telescoping fluid spring having first and second end portions defining a longitudinal axis, said first fluid spring having a length between its first and second end portions that is a first function of the compressive force applied to said first fluid spring along said longitudinal axis and that is retained within predetermined limits, said first fluid spring being pivotally attachable to said aircraft at its first end portion;
a support having first and second ends, the first end of said support being pivotally attachable to said aircraft, the second end of said support being pivotally attached to said first fluid spring at a first point on said second end portion of said first fluid spring;
a wheel support arm having an upper first end pivotally secured to said first fluid spring at a second point on the second end portion of said first fluid spring, said upper first end being attached to said second end portion of said first fluid spring by a joint which is pivotable about a horizontal axis;
a wheel attached to a lower end of said wheel support arm, said wheel being rotatable about a horizontal axis; and
a second telescoping fluid spring having third and fourth end portions, said third end portion being pivotally connected to said wheel support arm and said fourth end portion being pivotally connected to the second end portion of said first fluid spring, said first and second fluid springs being independently compressible.

9. The landing gear of claim 8 wherein said wheel support arm is rotatable about said longitudinal axis with respect to the aircraft.

10. The landing gear of claim 8 wherein the support comprises two linkages pivotally connected to each other, said support having a lowered configuration and a retracted configuration.

11. A landing gear for use with an aircraft, comprising, in combination:
a first spring-damper having first and second end portions defining a longitudinal axis, said first spring-damper having a length between its first and second end portions that is a first function of the compressive force applied to said first spring-damper along said longitudinal axis, said first spring-damper being pivotally attachable to said aircraft at its first end portion;
a support having first and second ends, the first end of said support being pivotally attachable to said aircraft, the second end of said support being pivotally attached to said first strut at a first point on said second end portion of said first spring-damper;
a wheel support arm having an upper first end pivotally secured to said first strut at a second point on the second end portion of said first spring-damper;
a wheel attached to a lower end of said wheel support arm, said wheel being rotatable about a horizontal axis; and
a second spring-damper having third and fourth end portions, said third end portion being pivotally connected to said wheel support arm and said fourth end portion being pivotally connected to a third point on the second end portion of said first spring-damper, said second spring-damper having a length that is a second function of the compressive force applied to said second spring-damper between said third and fourth end portions, said first and second fluid springs being independently compressible.

12. The landing gear of claim 11 wherein said first and second spring-dampers are telescoping fluid spring-dampers.

* * * * *